United States Patent [19]
Carter

[11] Patent Number: 6,006,140
[45] Date of Patent: *Dec. 21, 1999

[54] INFRARED MICROSCOPE STAGE CONTROL

[75] Inventor: Ralph L. Carter, Thame, United Kingdom

[73] Assignee: Perkin-Elmer Ltd., Beaconsfield, United Kingdom

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/611,264

[22] Filed: Mar. 5, 1996

[30] Foreign Application Priority Data

Mar. 6, 1995 [EP] European Pat. Off. ............. 95301428

[51] Int. Cl.⁶ .................................................. G05B 19/18
[52] U.S. Cl. ............................................ 700/56; 382/133
[58] Field of Search .......................... 364/167.02, 413.1, 364/552; 250/311, 306, 339.08; 356/237; 382/133

[56] References Cited

U.S. PATENT DOCUMENTS

| | | | |
|---|---|---|---|
| 4,146,788 | 3/1979 | Mirkin et al. | 250/311 |
| 4,202,037 | 5/1980 | Glaser et al. | 345/354 |
| 4,465,371 | 8/1984 | Pernick | 356/237 |
| 4,672,559 | 6/1987 | Jansson et al. | 364/525 |
| 4,672,676 | 6/1987 | Linger | 382/141 |
| 4,700,298 | 10/1987 | Palcic et al. | 364/413.1 |
| 4,845,552 | 7/1989 | Jaggi et al. | 358/93 |
| 4,902,132 | 2/1990 | Murphy, Jr. et al. | 356/339 |
| 5,038,035 | 8/1991 | Mishimura et al. | 250/311 |
| 5,262,967 | 11/1993 | Jaber et al. | 364/552 |
| 5,426,302 | 6/1995 | Marchman et al. | 250/306 |
| 5,459,384 | 10/1995 | Engelse et al. | 318/640 |
| 5,480,804 | 1/1996 | Niwa et al. | 435/286.1 |
| 5,506,416 | 4/1996 | Rizvi | 250/339.06 |
| 5,510,619 | 4/1996 | Zachmann et al. | 250/339.08 |
| 5,655,029 | 8/1997 | Rutebberg et al. | 382/133 |

FOREIGN PATENT DOCUMENTS

| | | |
|---|---|---|
| 0186490 | 2/1986 | European Pat. Off. . |
| 0353504 | 7/1990 | European Pat. Off. . |
| 0453239 | 10/1991 | European Pat. Off. . |

*Primary Examiner*—William Grant
*Assistant Examiner*—McDieunel Marc
*Attorney, Agent, or Firm*—David Aker

[57] ABSTRACT

A system for controlling a motor driven stage of a microscope (10) includes video camera (22) for creating a video image of a sample on the stage. A computer (12) and associated display are used to create an image of the sample on the display. Graphical markers are superimposed on the image and facilitate the identification of and subsequent acquisition of data from points at which IR data is to be obtained. Also disclosed is a method of creating a display of an area of the sample greater than that which can be viewed by the area.

20 Claims, 13 Drawing Sheets

6,006,140

INFRARED MICROSCOPE STAGE CONTROL

FIELD OF THE INVENTION

This invention relates to the control of microscopes with movable stages. The invention has particular, but not exclusive application, to the control of the movable stage of a microscope which is used in spectroscopy such as IR spectroscopy.

BACKGROUND OF THE INVENTION

In the field of spectroscopy it is known to provide a microscope which can operate in conjunction with a spectrophotometer. Such apparatus are used to obtain infrared spectra of samples. A known microscope is the Perkin-Elmer FT-IR microscope which is described for example in an article by D. W. Shearing, E. F. Young and T. P. Byron entitled "An FT-IR microscope", published in American Laboratory, November 1990. Such a microscope includes a movable stage on which a sample to be investigated can be mounted. The microscope permits both visible observation of the sample and analysis of the sample by infrared radiation, either in a transmitting mode or a reflectance mode. The microscope also includes a video camera which can be used in conjunction with the visible viewing means in order to generate a video image of the sample for display on the display means of a computer.

The microscope can be used in conjunction with a spectrophotometer such as a Perkin-Elmer System 2000 FT-IR spectrophotometer. This instrument can receive infrared radiation either transmitted via the sample or reflected from the sample and provide an output indicating the spectrum of the sample.

The stage of the microscope is movable so that in an initial step it can be moved in an X-Y plane to appropriately locate the sample so that analysis of a selected part of the sample can be achieved.

SUMMARY OF THE INVENTION

The present invention is concerned with a microscope in which there are driving means for imparting movement to the stage both in the X and Y directions.

The present invention is concerned with techniques which facilitate positioning of the sample stage using images of the stage on a display means of a computer. The invention also provides a facility which facilitates and enhances display of acquired data.

According to a first aspect of the present invention there is provided a method of controlling a motor driven stage of a microscope which has a video camera for viewing a sample on the stage, said method comprising creating on a display means of a computer coupled to the video camera an image of the sample, creating and superimposing on said image one or more graphical markers, using said marker or markers to create coordinate data identifying positions of interest on said sample and using said coordinate data subsequently to control the positioning of said stage.

According to a second aspect of the present invention there is provided a method of controlling a motor driven stage of a microscope which has a video camera for viewing a sample on said stage and an associated computer and display means for displaying a video image of an area viewed by said camera, said method comprising creating on said display means an image of an area of interest on said sample, storing data representative of said image, adjusting the position of said stage to identify another area of said sample and storing data representing that image, repeating said steps for a selected number of areas of said sample, combining said data to create an image of a larger area of said sample which is made up of said individual areas of interest, creating and superimposing on said larger area image one or more graphical markers, using said marker or markers to create coordinate data identifying positions on said sample, and subsequently using said coordinate data to control the positioning of said stage.

According to a third aspect of the present invention there is provided a system for controlling a motor driven stage of a microscope which has a video camera for viewing a sample on the stage, said system including a display means, and a computer for controlling said display means to create on said display an image of a sample on its microscope stage, said computer being arranged to create and superimpose on said image one or more graphical markers which can be used to create coordinate data identifying positions of interest which are used subsequently to position the stage for analysis of the sample.

According to a fourth aspect of the present invention there is provided a system for controlling a motor driven stage of a microscope which has a video camera for viewing a sample on the stage, said system including a display means and a computer for controlling the display to create on said display an image of an area of a sample on the microscope stage, said computer being arranged to store data representative of an image of the viewed area, to move the stage to another area and store data representative of that area, to repeat these steps for a selected number of areas and to combine the stored data to provide an image of the sample which is larger than the individual areas, said computer also being arranged to come to be displayed and superimposed on the larger area image one or more graphical members which are used to create coordinate data identifying positions of interest on the sample which can be stored and used subsequently to position the stage for analysis of the sample.

BRIEF DESCRIPTION OF THE DRAWINGS

The invention will be described now by way of example only, with particular reference to the accompanying drawings. In the drawings.

DETAILED DESCRIPTION OF THE PREFERRED EMBODIMENT

Figure 1:
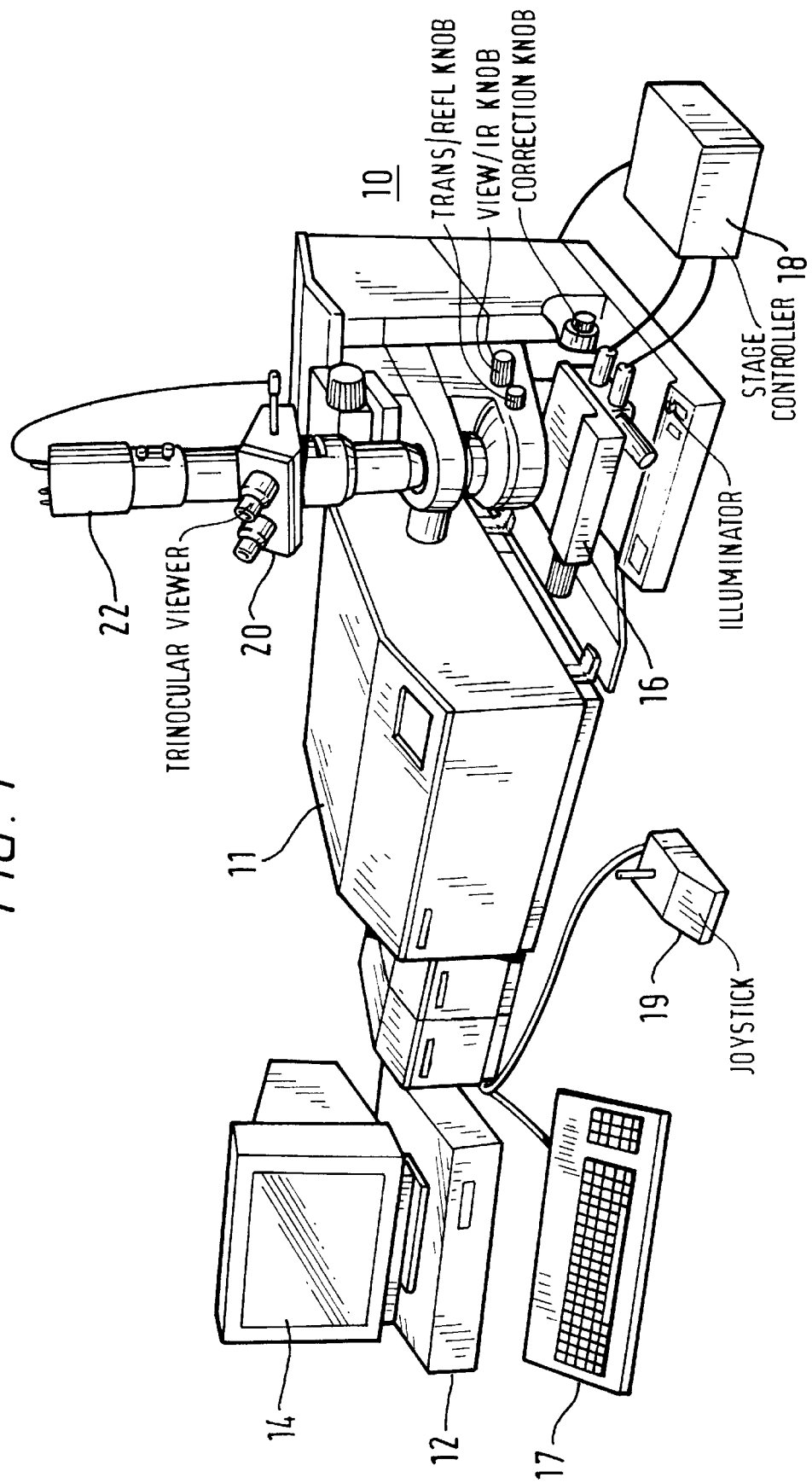
FIG. 1 is a schematic view of an FT-IR microscope operating in accordance with the principles of the present invention.

The invention will be described specifically with reference to an FT-IR microscope used in conjunction with an IR spectrophotometer. A basic arrangement is illustrated in FIG. 1 of the drawings. It comprises a microscope (10), a spectrophotometer (11), a computer (12) with a display means (14), a keyboard (17) and joystick (19). The microscope includes a movable stage (16) which can be driven in X and Y directions by means of a stage controller (18). The microscope also includes viewing means (20) for enabling the sample on the stage (16) to be viewed prior to an analysis step and also includes a video camera (22) which can be used to generate a video image of the sample stage.

Figure 2:
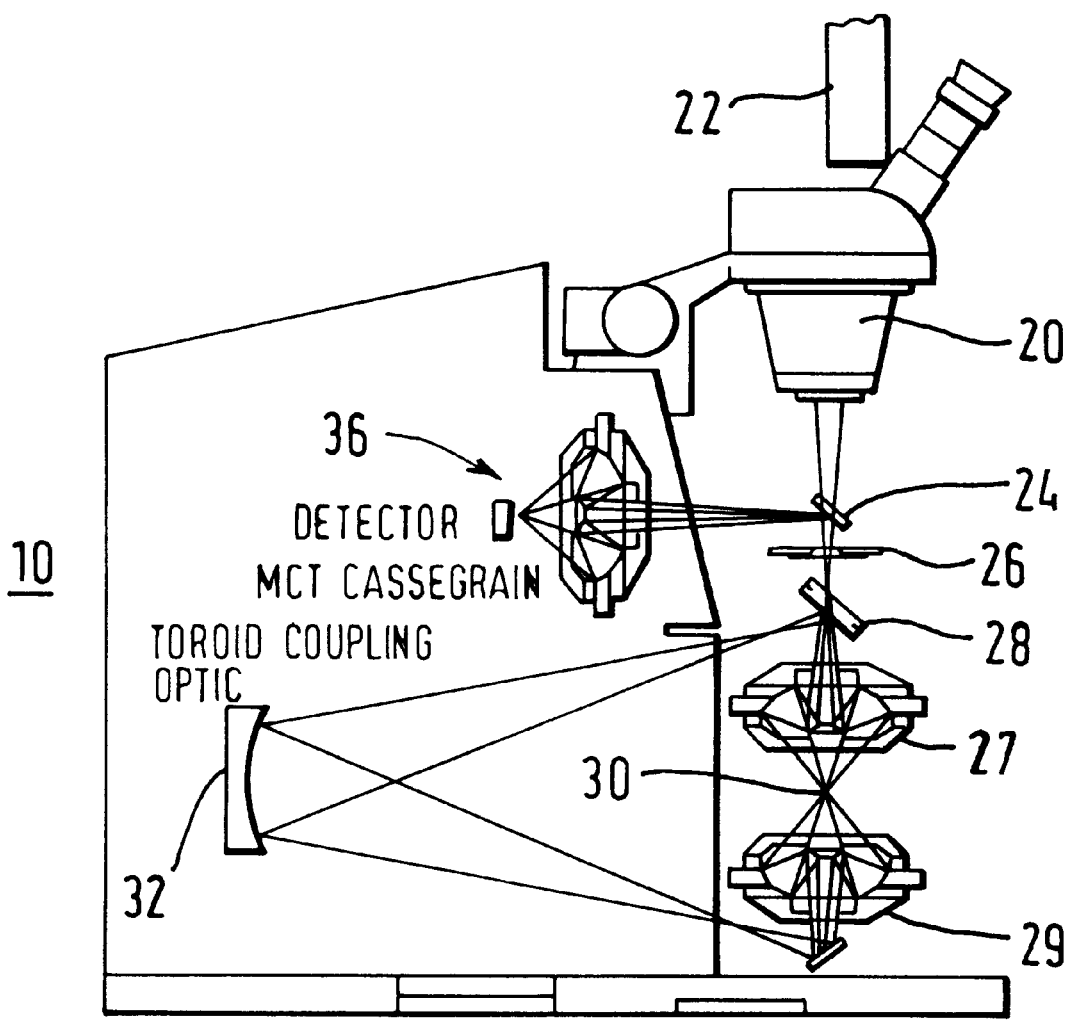
FIG. 2 is a side elevation showing the principal elements of an FT-IR microscope.

The microscope (10) can be an FT-IR microscope of the type manufactured by Perkin-Elmer Corporation. Such a microscope has a basic structure which is illustrated in FIG. 2 of the drawings. The microscope includes the optical microscope (20), a view/IR mirror (24), a remote aperture (26), a transmittance/reflectance mirror (28), an objective Cassegrain lens assembly (27) and a condenser Cassegrain lens assembly (29) with the sample position (30) being located therebetween. The drivable stage (16) is located at the sample position. In addition, the microscope includes a toroid coupling optic (32) which is used to direct radiation towards the sample.

Alongside the view/IR slider there is provided a detector (36) of the MCT type which can provide data in response to received infrared radiation which is fed to the spectrophotometer for analysis. It is not necessary for the purposes of the present invention to describe the microscope in any more detail since its function will be apparent to those skilled in the art. A fuller description can be found in the manual of The Perkin-Elmer FT-IR microscope and also in the previously referred to article entitled "An FT-IR microscope" published in American Laboratory of November 1990.

In operating such an arrangement a sample is placed upon the movable stage (16) and the first step is to position the sample prior to analysing it by irradiating it with infrared radiation. The sample is positioned by viewing it either optically through the microscope (20) or on the display means (14) using the video camera (22), or both. Once the stage has been positioned appropriately, then a selected area of the sample can be analysed by obtaining an infrared spectrum. The present technique is concerned particularly with identifying areas of interest on the sample using the display means (14) and the subsequent control of the stage during an analysis step to enable those areas of interest to be analysed automatically.

Figure 3:
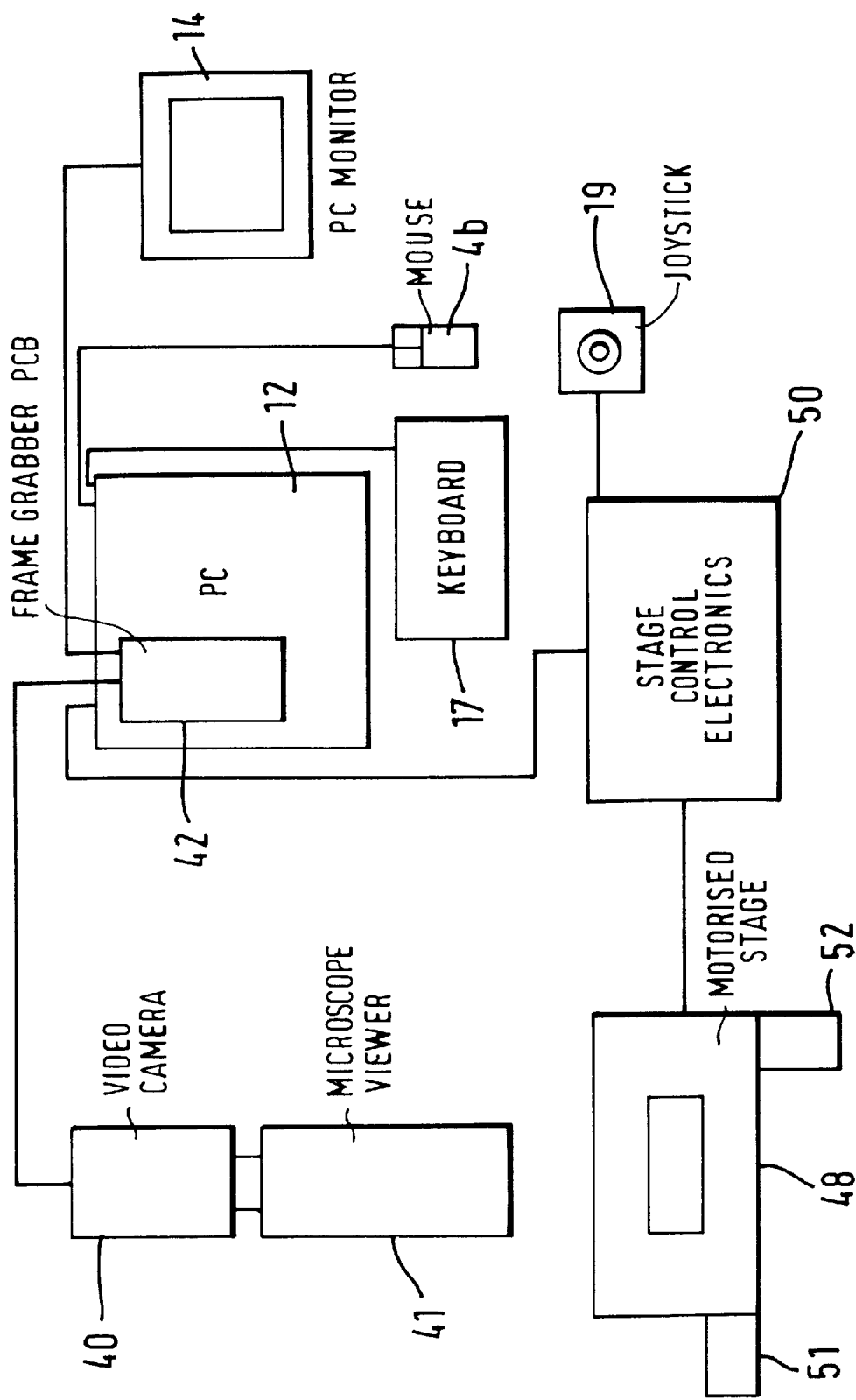
FIG. 3 is a schematic block diagram of a microscope assembly in accordance with an embodiment of the present invention.

This technique will be described now with reference to FIG. 3 of the drawings, which is a schematic block representation of an embodiment of the invention. In FIG. 3 the video camera is shown at (40) and operates in conjunction with the microscope viewer which is illustrated at (41). The video camera is connected to a circuit board (42) of the computer (12), that circuit board providing the computer (12) with the capability of controlling the display means to display a video image of the movable stage (16). The circuit board (42) is a commercially available board known as a frame grabbing card. Associated with the computer is the keyboard (17) and a pointer control, typically a mouse, (46). The motorised stage is shown at (48) and operates in conjunction with stage control electronics (50) which are coupled to the computer (12). Associated with the electronics (50) is the joystick (19) which enables an operator to manually control movement of the movable stage (48). The stage (48) includes motors (51, 52) for driving the stage in an X-Y plane.

In the following description it will be assumed that the software is operating in a Windows® environment but it will be appreciated that the invention is not restricted to such an example. The computer (12) is thus one which can operate the Windows® operating system.

Initially the microscope (20) is used to view the sample on the stage and also an image of a portion of the sample is generated on the display means (14) using the video camera (12). The stage (16) can be controlled electronically through the controller (18) either by use of the joystick controller (19) or in response to commands generated by the computer (12). Briefly the video camera (40) samples the image and transmits electronic data to the frame grabbing card (42) of the computer and this data is processed and used to generate a display which is a live video image of the sample. In addition the software stored in the computer can superimpose graphical images on the image of the sample.

Figure 4:
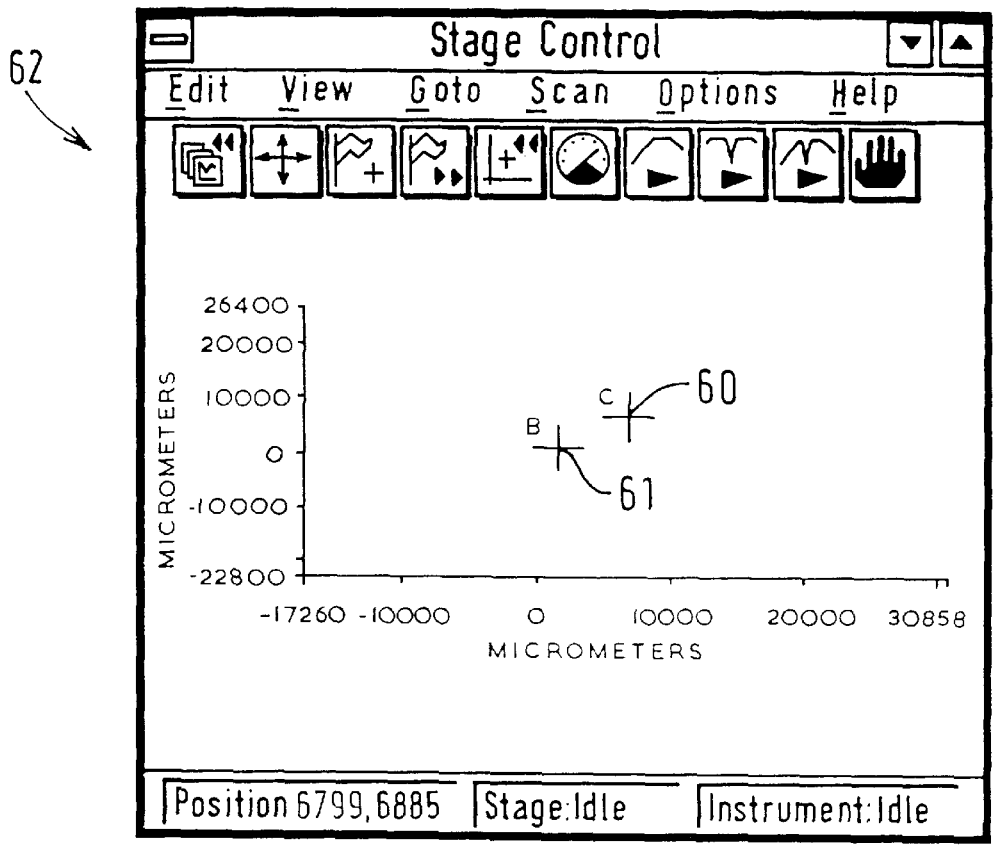
FIGS. 4, 4a, 4b, 4c, 5 and 5a show displays which can be generated on the display means of FIG. 3.
Figure 5:
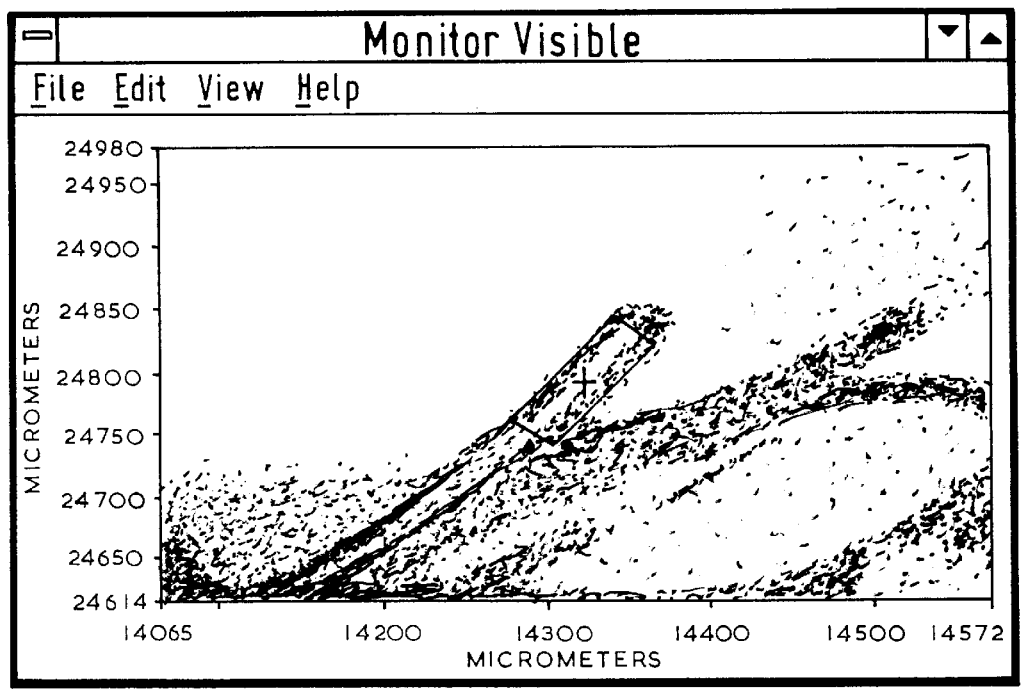
Figure 5A:
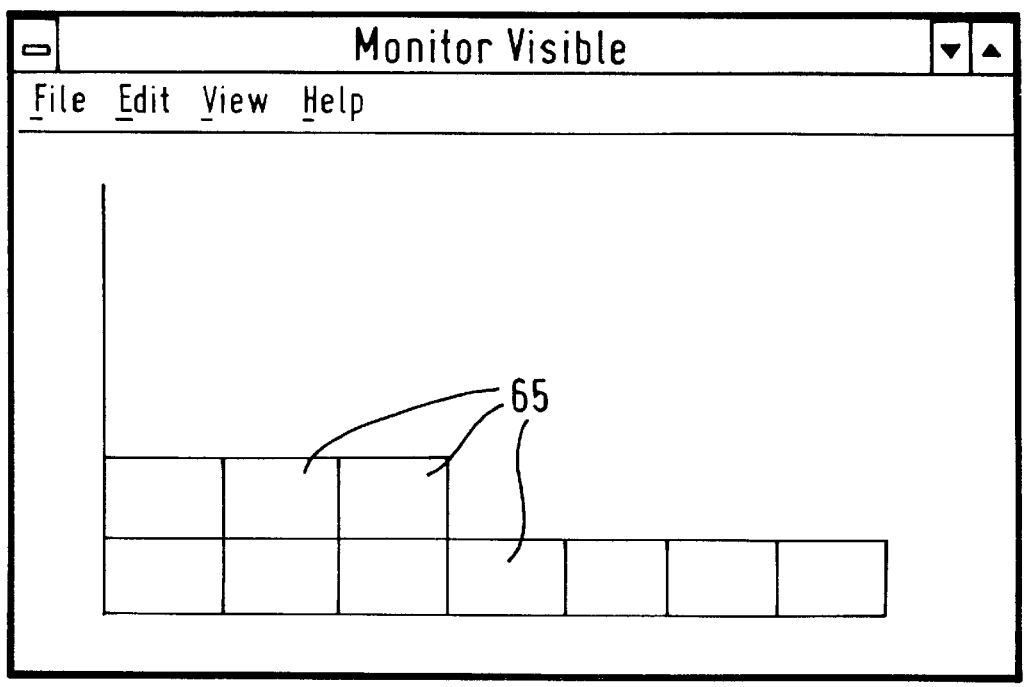

FIGS. 4 and 5 show typical displays which can be created. The first display is known as a stage control window which enables an operator to adjust the position of the sample stage. As can be seen, the display includes markers (60 and 61). the marker (60) is a current aperture marker which shows the position on the sample stage of the microscope aperture. It can be used to move the sample stage to different positions without using the joystick. In order to do this the mouse is controlled to move the mouse pointer close to the marker (60). The marker (60) is then dragged across the display by moving the mouse position. The sample stage is then moved by the stage control electronics (50) to a position corresponding to the repositioned pointer (60). It will be appreciated that the stage can be continuously repositioned using this procedure. The display shown in FIG. 4 also includes a tool bar facility (62) which comprises a number of icons selectable using the mouse.

FIG. 5 shows an example of a display which is a video image of an area of the sample itself. The computer is programmed so that markers can be superimposed on the image of the sample and moved around the sample by means of a pointer control, typically the mouse. In use of the apparatus a sample to be analysed is placed on the sample stage of the microscope. The sample stage is positioned roughly by moving the stage with the joystick control. This positioning can be carried out visually.

The two displays (FIG. 4 and FIG. 5) are then viewed on the display means simultaneously. An operator identifies on the FIG. 5 window an area of interest and using the current stage position marker (60), as described above, moves the stage until that area is centred on the display. Then by using the mouse control buttons the operator marks the area of intent and this produces a marker (61) which does not subsequently move relatively to the area it identifies. The display (4) can also display the coordinates of the marked position as indicated in FIG. 4. Those coordinates are also in the computer memory.

Figure 4C:
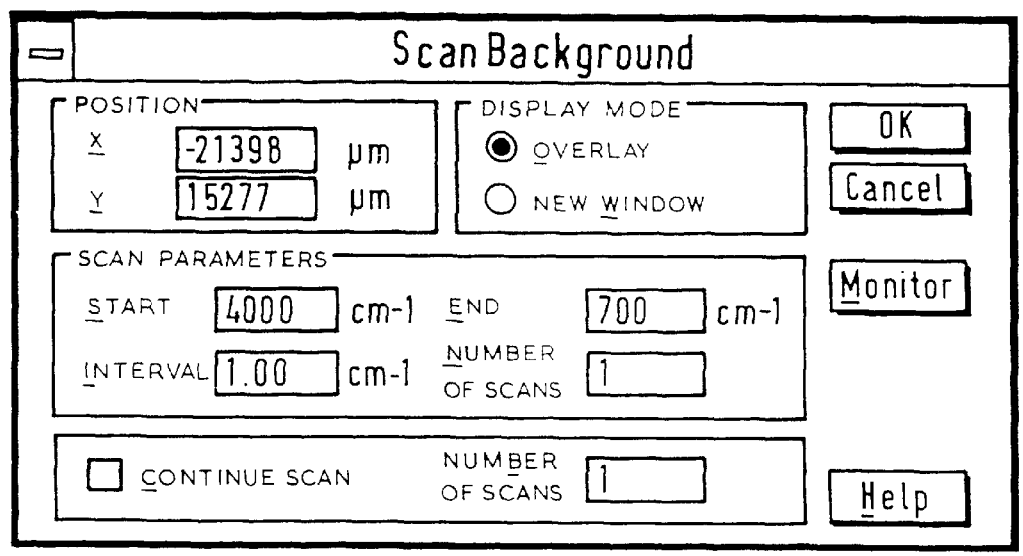
Figure 4A:
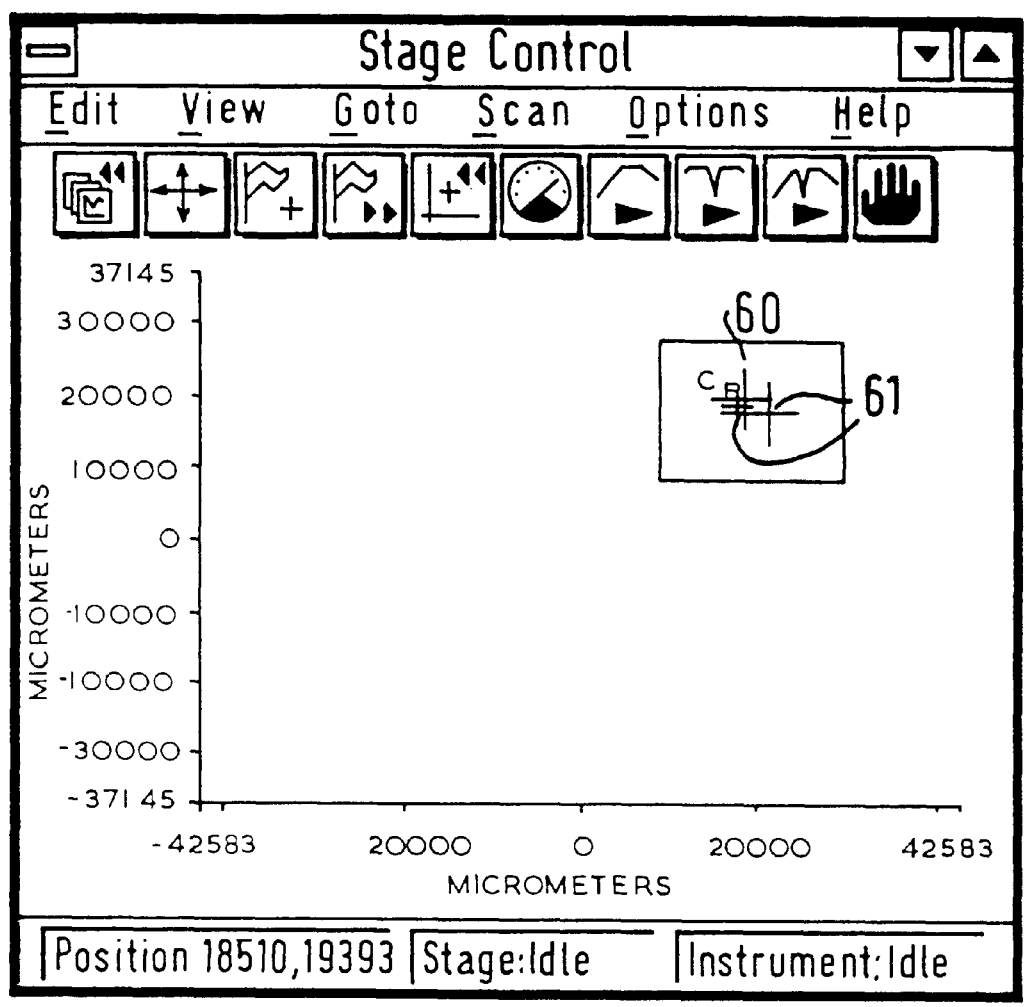
Figure 4B:
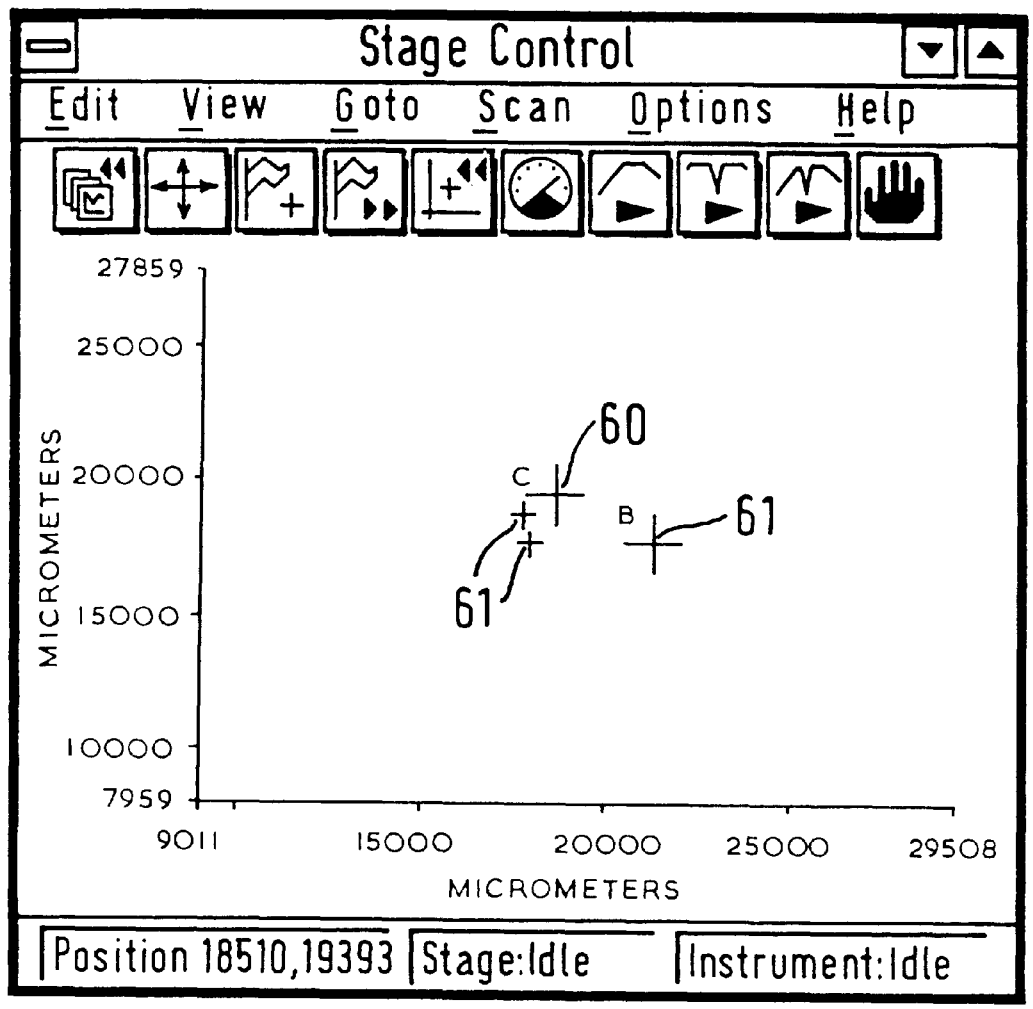

The software then allows an operator to move to another area of interest using the marker (60) as described above and to store in a similar manner data representative of the coordinates of that point of interest. This process can be repeated for as many areas of interest as necessary and coordinate data relating to those areas of interest are stored in the computer memory. For each area of interest a marker (61) will appear on the display. FIG. 4a shows a display with a number of marked points (61). FIG. 4a also shows how a box can be drawn around the points under the control of a mouse and then that area defined by the box is expanded to create another window (FIG. 4b) with the points displayed on a different scale.

The software for the above operation operates generally as follows. The software continuously polls the stage control electronics (50) for the current stage position. This software has been precalibrated with camera image size information and is then able to calculate the stage coordinates of any point on the live video image displayed on the display means (14). Once the feature on the sample is visible in the display it can be rapidly centred by pointing at it using the mouse, as explained above. The software then calculates the coordinates and causes the stage (16) to move to them. The current centre of view is marked with a small computer generated marker. As the stage is moved this marker is repositioned so as to remain with the feature it is marking. This is repeated for each point of interest to be defined.

Figure 6:
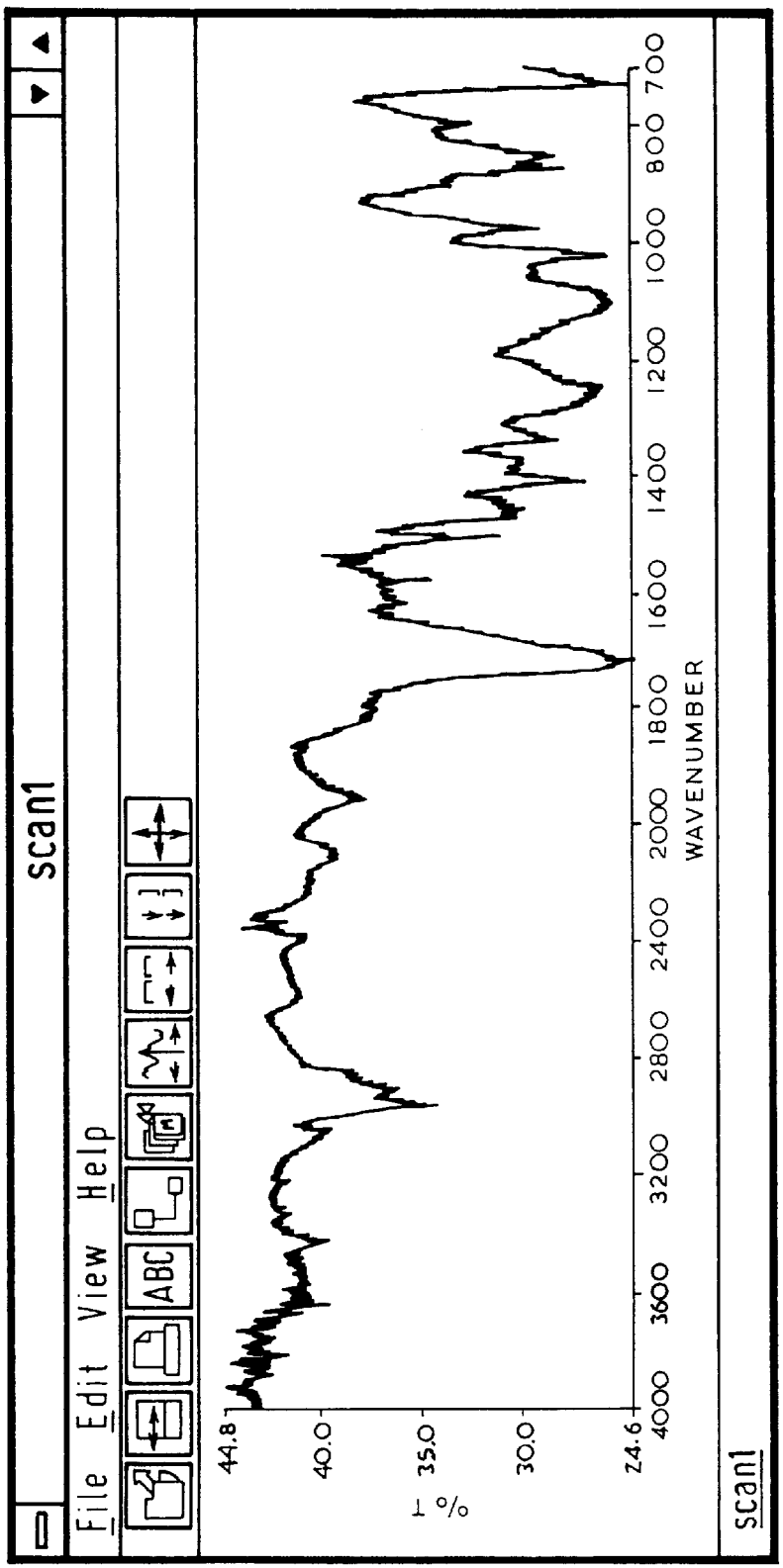
FIG. 6 shows a display of an acquired spectrum.

Subsequently the software is used to control automatically the acquisition of analysis data for each of the points of interest during an infrared scanning operation. In setting up for spectra acquisition an operator is presented with a window of the type shown in FIG. 4c. this enables the operator to set up the scan parameters. This particular window has been designed for use with the Paragon 1000 instrument. In the acquisition of spectra operation the stage is moved automatically to positions corresponding to the stored coordinate data, i.e. the positions identified by markers (61). At each position the sample is scanned with infrared radiation in the usual manner and a spectrum acquired by the spectrophotometer. These spectra can be displayed on the display means and FIG. 6 illustrates an example of such a display.

Thus it will be seen that the above arrangement provides an operator with an ability to superimpose computer generated graphic markers on a live video image of a sample under investigation, these images being displayed on a display screen of a computer. The arrangement also enables an operator to define data representing the position of points of interest on the sample using the computer generated graphic markers and the live video image of the sample. Subsequently the coordinate data can be used during a scanning step to automatically position the sample stage (16) in order to acquire infrared spectral data for each of the points of interest identified by an operator. A further feature of the present arrangement is that the markers (61) enable an operator to return the stage easily and accurately to a position at which a marked point on a sample can be viewed again.

An enhancement to the above arrangement will now be described also with reference to the existing Figures. As will be appreciated the video camera (22) can generate an image only of a certain area of the sample under investigation. The enhancement to be described enables the display means to create a display of a larger area of the sample than can be obtained from a single view of the camera.

The way in which the image is created on the display is as described above. In the present enhancement the software is provided with stage coordinates which describe or define a region of interest. The program then controls the stage to move to a number of positions in that region and at each position a video image of the region is acquired. These images are stored in the memory of the computer (12). The individual images are then combined to form on the display means an image of the whole of the target region which represents the combination of the individual areas. This is illustrated in FIG. 4a where each region (65) represents an area corresponding to the area displayed on FIG. 5. Once this process has been completed the image of the large area is displayed on the screen (14) and a graphical marker is superimposed on that display as described above. That marker can be used as described above in order to identify areas of interest as previously described. The coordinates of those points of interest are evaluated and data representative of those coordinates stored in the computer memory. These coordinates are then used in the manner already described in order to obtain infrared spectra from the points of interest.

It will thus be seen that the enhancement allows the display means to display an image of an area of the sample which is much greater than the area which can be viewed by the camera (22) at any one time. This is a significant feature which improves the speed at which infrared data can be acquired.

The software operating on the computer can also be arranged to provide other facilities. For example where a number of spectra have been acquired as described above the software can be arranged so the display means is caused to display second or third graphical representations of the data. As will be apparent to those skilled in the art the data resulting from the IR analysis can be processed in a number of ways and appropriate displays generated. Different versions of the data can be displayed simultaneously in different windows. Graphical software controls are superimposed on those displays and these respond to instruction input via the mouse. The control can be used such that their positions on the axes of a graph (such as that of FIG. 6) affect not only the data displayed in the windows containing that graph but also parameters in another window or windows which may for example be displaying the data in a different format. Thus it is possible by moving a control in one window to effect a calculation which modifies all the windows displaying that data.

Also the software can be arranged so that it is capable of controlling the storing of data in the computer memory such that data representing all parameters associated with the display of the acquired IR data is stored in a single file. This means that when the file is recalled all the data is displayed in the windows in the state it was at the time of being stored.

Other facilities which can be provided include identifying for example peaks in a spectrum. In FIG. 6 for example the mouse controlled pointer can be used to point to a peak whose wavelength is to be identified. By clicking on the mouse the display can be instructed to display the wavelength numerically. Alternatively the display can be operated to drive a line from the peak to the abscissa so that the wavelength can be read off. Also spectra can be overlaid one on another for comparison purposes.

A flow chart which illustrates the software operating in the computer (12) is shown in FIG. 7.

Another procedure which can be carried out with the present system is that of mapping. In order to create a map, an area of interest is first identified using for example the marker (60) as described above. The area to be mapped is then defined using the marker (60). The marker is first moved to one corner of the area and that corner marked using the mouse. The other corners are then identified in a similar way.

Figure 6A:
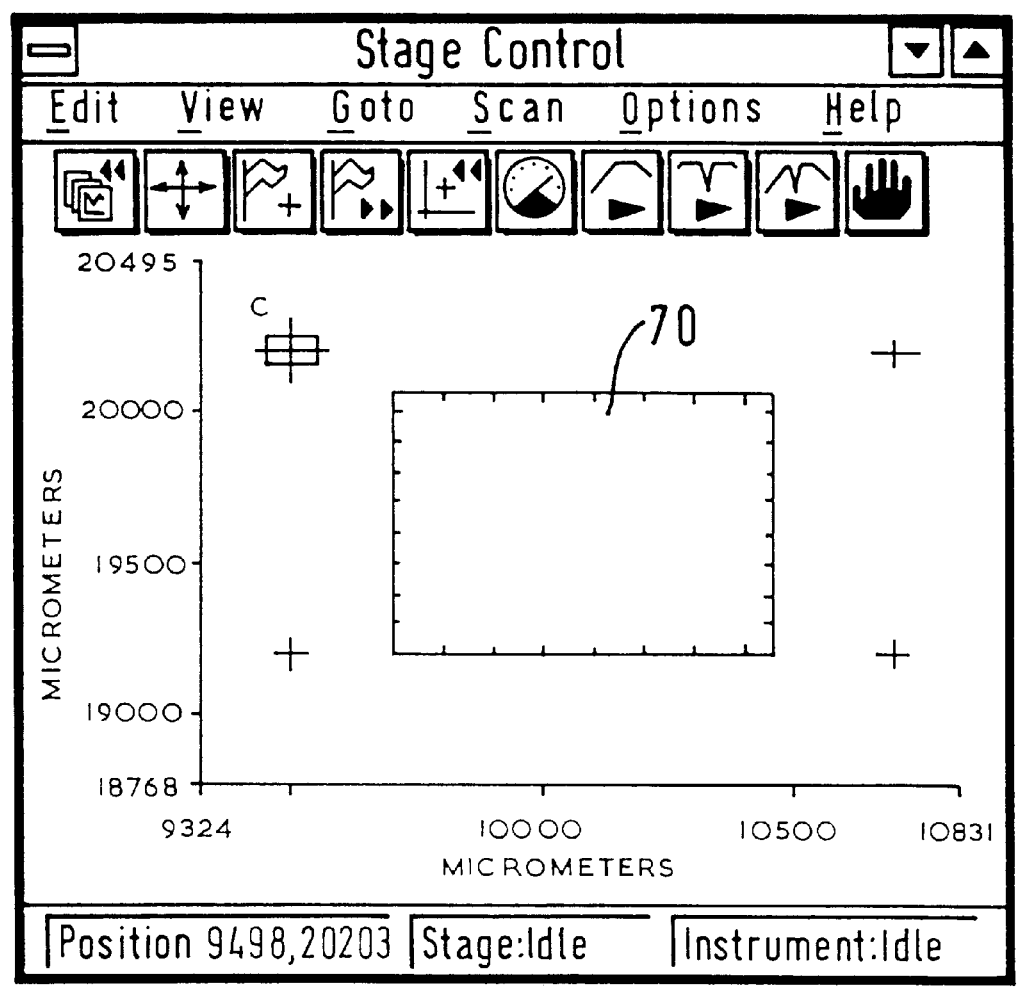
FIG. 6a shows a display operated during a mapping procedure.
Figure 7A:
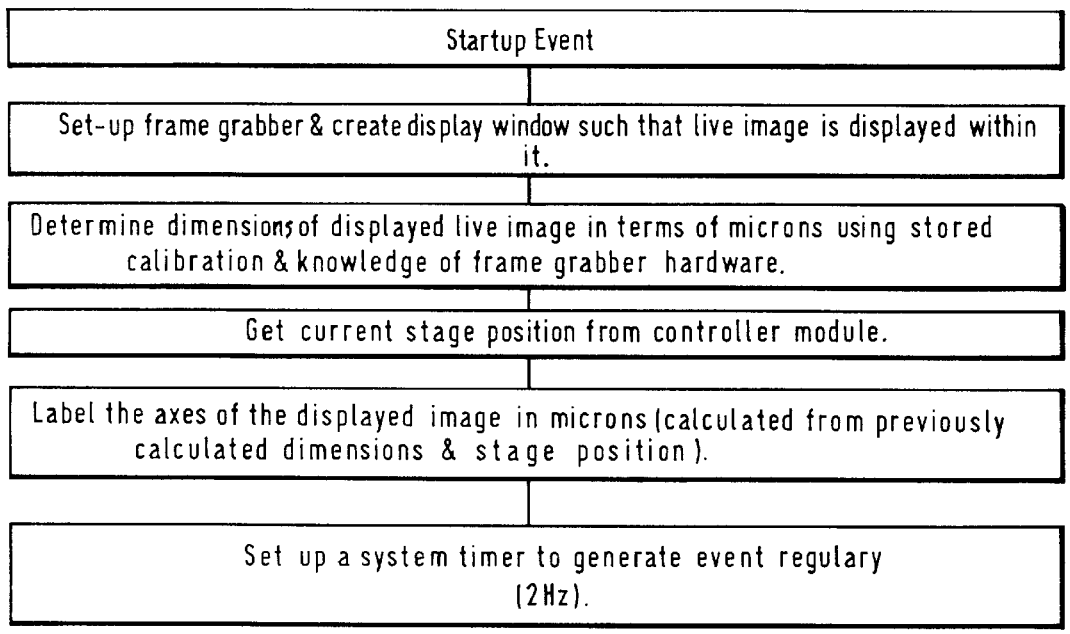
FIGS. 7a to 7d are flow charts of the software operating on the computer.
Figure 7A:
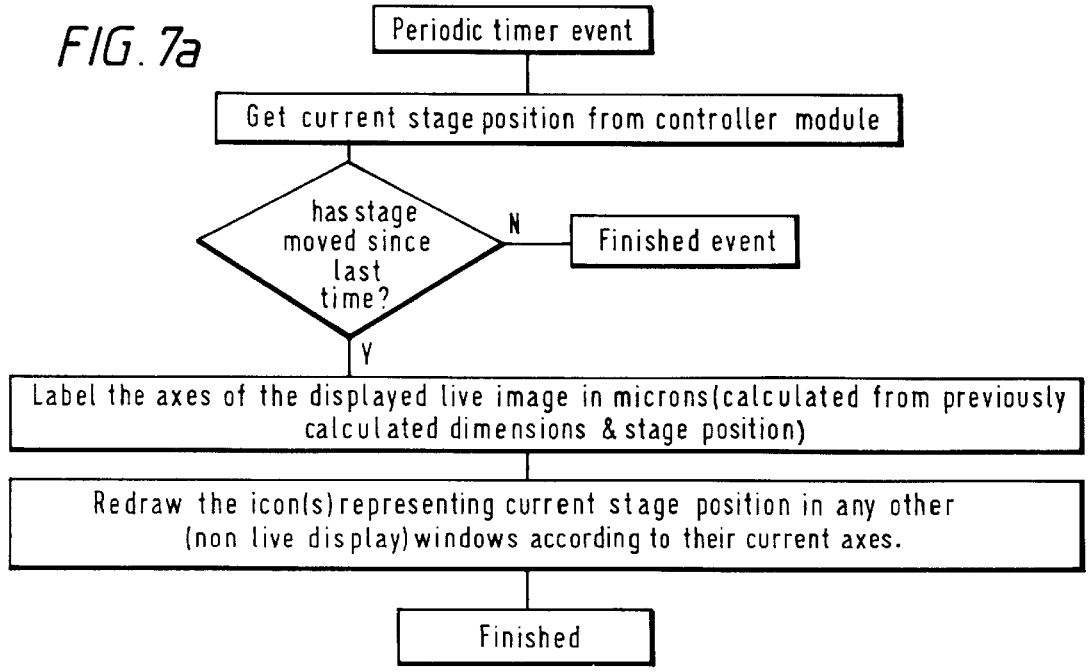
Figure 7B:
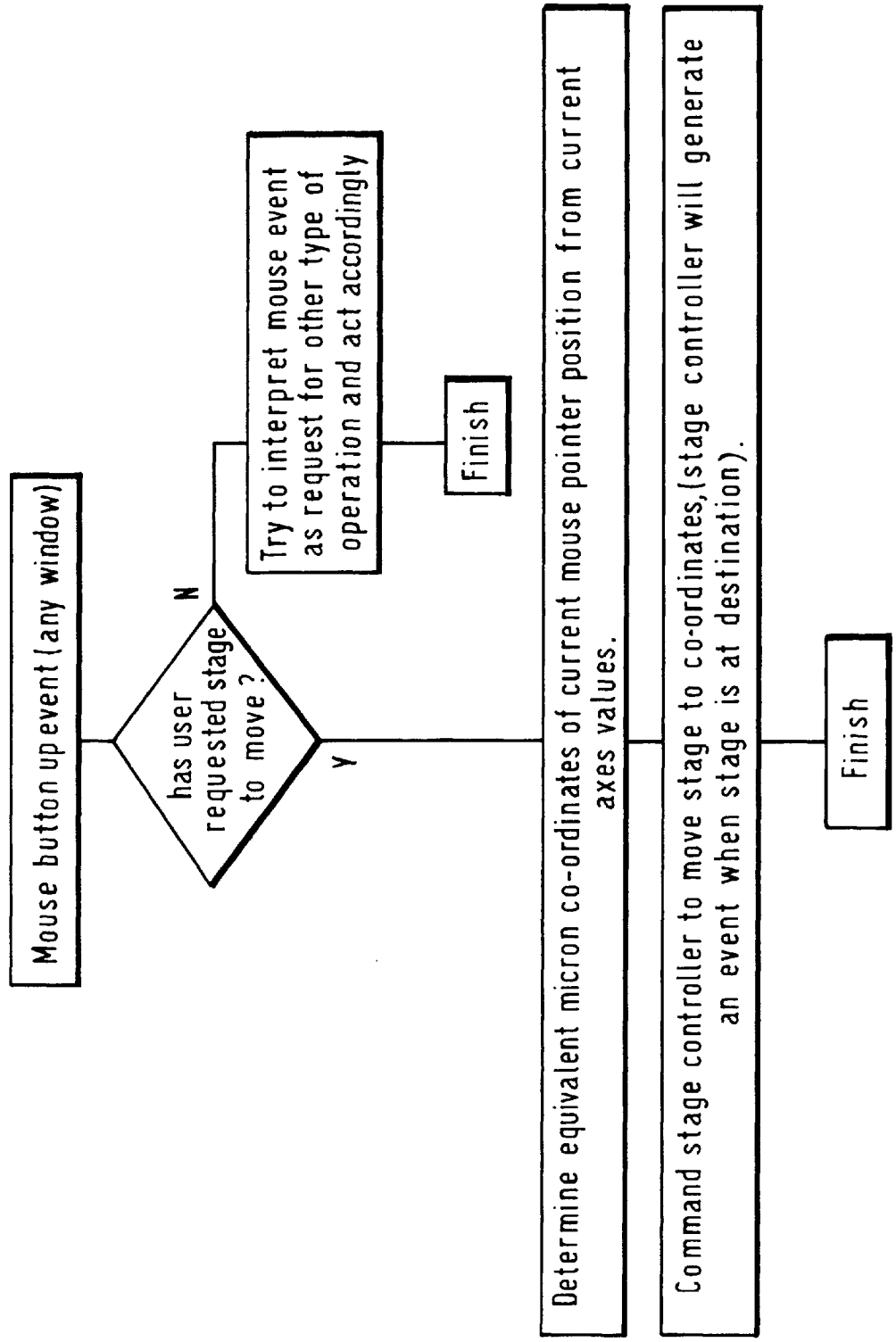
Figure 7C:
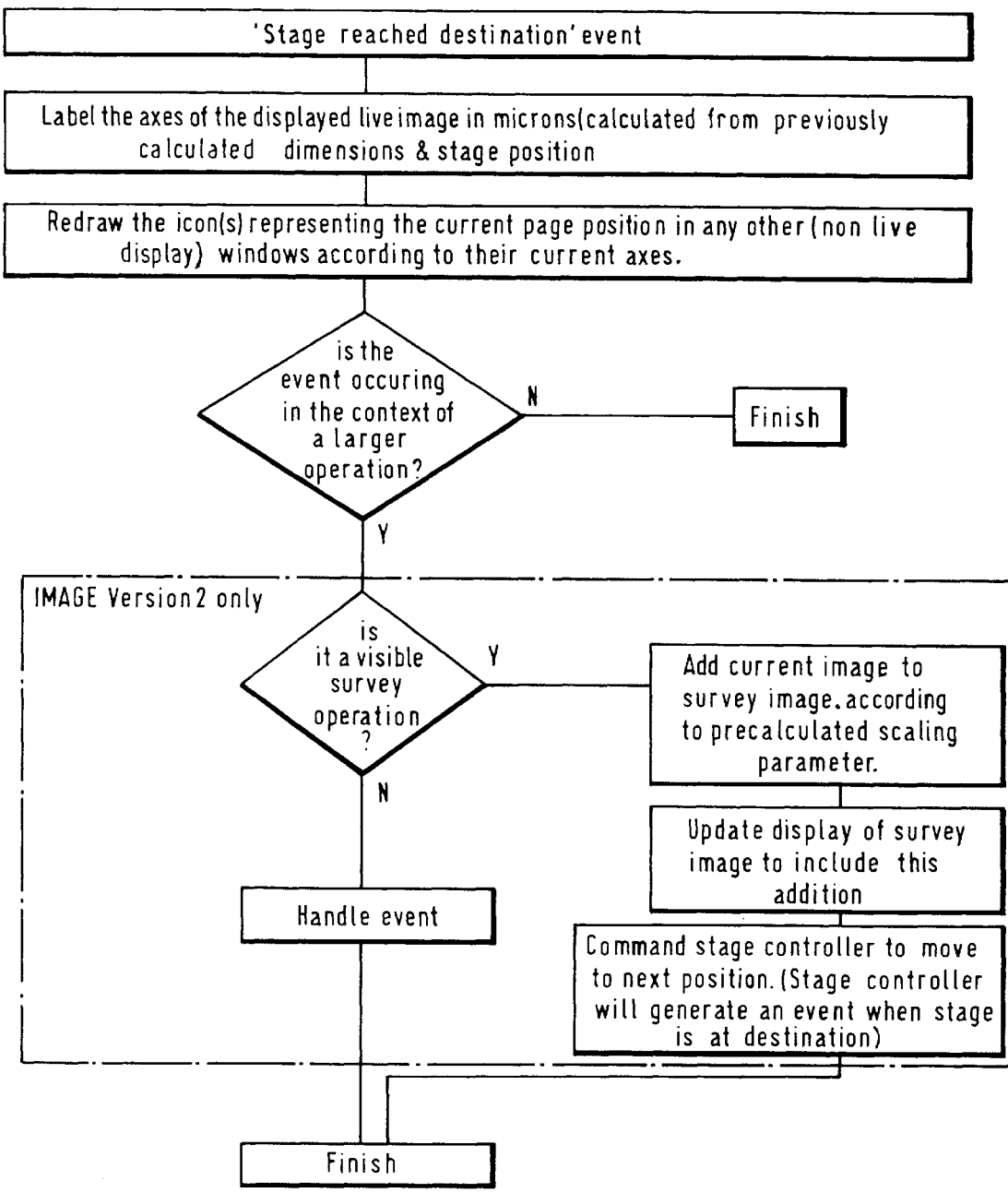
Figure 7D:
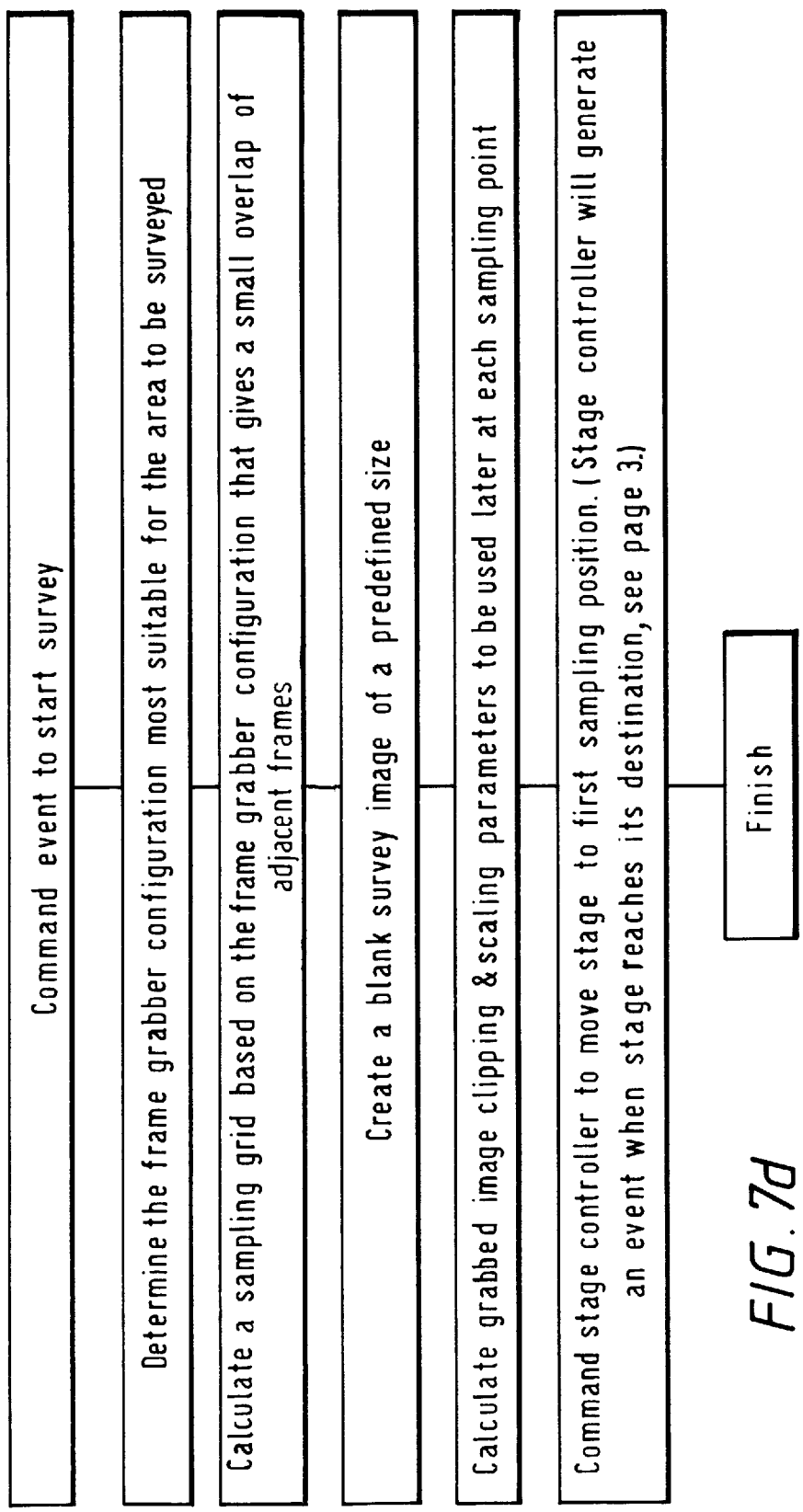

Using other windows an operator then defines the parameters of the map such as the number of scans and the intervals between scan points on the map. The system can then display grid boundary representing the area to be mapped. This is illustrated at (70) in FIG. 6a. The system is then instructed to collect data from the points defined on the grid. The stage is moved to each point on the grid and data, e.g. a spectra, collected at each point.

Once obtained the map data can be presented in a number of ways. For example coloured blocks can be used to show the data from each area. A spectra from a particular point on the grid can be selected and displayed contours can be added to and displayed on the map. Surface projection displays can be created for the area mapped.

I claim:

1. A method of operating an IR-microscope by controlling a motor driven stage of a microscope which has a video camera for viewing a sample on the stage, said method comprising creating on a display means of a computer coupled to the video camera an image of the sample, creating and superimposing on said image one or more graphical markers, using said marker or markers to create coordinate data identifying positions of interest on said sample, storing said data and using said stored coordinate data subsequently to control the positioning of said stage such that the stage is moved successively to the or each position of interest and IR-data is acquired for the or each position of interest.

2. A method according to claim 1, wherein said method is carried out using a Windows® type operating system.

3. A method according to claim 2, wherein data relating to a number of windows is stored in a single file.

4. A method according to claim 3, wherein the data stored relates both to the image of the sample and the acquired IR-data.

5. A method according to claim 1, wherein said display is arranged to display a video image of the sample simultaneously with a display of data relating to the stage control.

6. A method according to claim 1, wherein a graphical marker operating in one window under the control of a pointer control and as a mouse is used to adjust the display in that one window, that adjustment being reflected in another window or windows displaying corresponding data.

7. A method according to claim 1, wherein such markers are used to create data relating to an area of a sample which is to be mapped.

8. The method according to claim 1, wherein said coordinate data is numeric.

9. A method of operating an IR-microscope by controlling a motor driven stage of a microscope which has a video camera for viewing a sample on said stage and an associated computer and display means for displaying a video image of an area viewed by said camera, said method comprising creating on said display means an image of an area of interest on said sample, storing data representative of said image, adjusting the position of said stage to identify another area of said sample and storing data representing that image, repeating said steps for a selected number of areas of said sample, combining said data to create an image of a larger area of said sample which is made up of said individual areas of interest, creating and superimposing on said larger area image one or more graphical markers, using said marker or markers to create coordinate data identifying positions on said sample, and subsequently using said coordinate data to control the positioning of said stage, such that the stage is moved successively to the or each position of interest and IR-data is acquired for the or each position of interest.

10. A method according to claim 9, wherein said method is carried out using a Windows® type operating system.

11. A method according to claim 10, wherein said display is arranged to display a video image of the sample simultaneously with a display of data relating to the stage control.

12. A method according to claim 10, wherein data relating to a number of windows is stored in a single file.

13. A method according to claim 12, wherein the data stored relates both to the image of the sample and the acquired IR-data.

14. A method according to claim 9, wherein a graphical marker operating in one window under the control of a pointer control and as a mouse is used to adjust the display in that one window, that adjustment being reflected in another window or windows displaying corresponding data.

15. A method according to claim 9, wherein such markers are used to create data relating to an area of a sample which is to be mapped.

16. The method according to claim 9, wherein said individual areas of interest are adjacent to one another and arranged in a two dimensional pattern.

17. A system for acquiring IR-data including an IR-microscope unit, a motor driven stage, said microscope having a video camera for viewing a sample on the stage, said system including a display means, and a computer for controlling said display means to create on said display an image of a sample on its microscope stage, said computer being arranged to create and superimpose on said image one or more graphical markers which can be used to create coordinate data identifying positions of interest which are used subsequently to position the stage for analysis of the sample, such that the stage is moved successively to the or each position of interest and IR-data is acquired for the or each position of interest.

18. The appartus according to claim 17, wherein said coordinate data is numeric.

19. A system for acquiring IR-data including an IR-microscope with a motor driven stage, said microscope having a video camera for viewing a sample on the stage, said system including a display means and a computer for controlling the display to create on said display an image of an area of a sample on the microscope stage, said computer being arranged to store data representative of an image of the viewed area, to move the stage to another area and store data representative of that area, to repeat these steps for a selected number of areas and to combine the stored data to provide an image of the sample which is larger than the individual areas, said computer also being arranged to come to be displayed and superimposed on the larger area image one or more graphical members which are used to create coordinate data identifying positions of interest on the sample which can be stored and used subsequently to position the stage for analysis of the sample, such that the stage is moved successively to the or each position of interest and IR-data is acquired for the or each position of interest.

20. The system according to claim 19, wherein the selected number of areas are adjacent to one another and arranged in a two dimensional pattern.

* * * * *